United States Patent Office 3,476,728
Patented Nov. 4, 1969

3,476,728
PROCESS FOR THE POLYMERIZATION OF CYCLOPENTENE TO UNSATURATED HIGH POLYMERS
Giulio Natta, Gino Dall'Asta, and Giorgio Mazzanti, Milan, Italy, assignors to Montecatini Edison S.p.A., Milan, Italy
No Drawing. Filed Oct. 19, 1966, Ser. No. 587,652
Claims priority, application Italy, Oct. 20, 1965, 10,293/65
Int. Cl. C08f 1/28, 5/00
U.S. Cl. 260—93.1
9 Claims

ABSTRACT OF THE DISCLOSURE

Cyclopentene is polymerized to linear unsaturated, high molecular weight polypentanamers in contact with a catalyst obtained by mixing tungsten dichloride and aluminum chloride with a halogenated organometallic aluminum compound. Depending on the molar ratio of the halogenated organometallic aluminum compound to tungsten dichloride, essentially all of the units of cyclopentene in the polymer have trans double bonds, or essentially all of said units have cis double bonds.

---

An object of this invention is to provide a new process for polymerizing cyclopentene to linear high molecular weight polypentenamers which are highly stereoregular.

This and other objects are accomplished by the present invention in accordance with which it is found that cyclopentene can be polymerized to polymers as aforesaid in contact with a catalyst prepared by mixing an organometallic compound and a transition metal salt in proportions such that the molar ratio between the organometallic compound and transition metal salt is relatively low, provided that the catalyst is the reaction product obtained by intimately mixing tungsten dichloride and aluminum chloride with a halogenated organometallic aluminum compound.

The use of the relatively low molar ratio of organometallic compound to transition metal compound is advantageous in that it permits of a saving in the amount of costly organometallic compound required to obtain an effective polymerization catalyst.

The mixture of tungsten dichloride and aluminum chloride is preferably prepared by reducing tungsten hexachloride with the stoichiometric amount of aluminum metal, according to the reaction scheme:

$$3WCl_6 + 4Al \rightarrow 3WCl_2 + 4AlCl_3$$

In this instance, the molar ratio between $AlCl_3$ and $WCl_2$ in the mixture is 4:3. Mixtures of the two components in which the $AlCl_3/WCl_2$ molar ratio is higher, and up to 5:1, can be used and can be obtained by mixing suitable amounts of aluminum chloride with tungsten hexachloride before reduction of the $WCl_6$ with aluminum metal. Also, the larger amount of aluminum chloride can be added to pre-formed tungsten dichloride, conveniently by mixing the tungsten dichloride with the required amount of aluminum chloride in a ball mill.

Organometallic compounds suitable for this purpose include $$Al(C_2H_5)_2Cl$$
$$Al_2(C_2H_5)_3Cl_3$$
$$Al(C_2H_5)Cl_2$$
$$Al(C_2H_5)_2Br$$
$$Al(C_2H_5)Br_2$$

We have found, further, that the molar ratio between the halogenated organometallic compound and tungsten dichloride controls the stereoregularity of the polypentenamer obtained. Thus, when the molar ratio between the organometallic aluminum compound and tungsten dichloride is between 1:1 and 3:1, the polypentenamer obtained is characterized in that essentially all of the units of cyclopentene in the polymer have trans double bonds. In contrast, when the molar ratio between the organometallic aluminum compound and tungsten dichloride is below 1:1, that is, when it is in the range 0.5:1, to 0.1:1, the polypentenamer obtained has a different stereoregularity in that essentially all of the units of cyclopentene in the polymer have cis double bonds.

It is possible, therefore, to polymerize the cyclopentene stereospecifically to a high molecular weight polypentenamer having a predetermined stereoregularity by selection of the molar ratio of the organometallic aluminum compound to tungsten dichloride in the range 0.5:1 to 5:1.

The rate at which the cyclopentene is polymerized and the yield of polypentenamer can be increased by adding an oxygenated compound, more particularly an organic peroxide such as benzoyl peroxide, to the catalyst. The amount of peroxide used is preferably 0.1 to 5.0 mols per mol of tungsten dichloride.

The molar ratio between the cyclopentene and tungsten dichloride is comprised in the range 50:1 to 10,000:1, and preferably, in the range 200:1 to 3,000:1.

The process of this invention makes it possible to polymerize cyclopentene to good yields of linear, high molecular weight polymer at a high reaction rate. It is possible, by the practice of this invention, to obtain a yield of the polymer amounting to 70% by weight (based on the amount by weight of monomer used) in one hour and a yield of 35% by weight (based on the amount of monomer used by weight) in five minutes.

The polymerization can be carried out at a temperature of $-50°$ C. to $+70°$ C., and in the presence or absence of aliphatic or aromatic hydrocarbons as diluents. Preferably, the polymerization is carried out in the absence of a diluent.

It is possible, also, to effect the polymerization of the cyclopentene in the presence of Lewis bases which function as complexing agents for the catalyst.

The polypentenamers obtained by the process of this invention can be used as elastomers or synthetic rubbers, as starting material for expanded (foamed) products, as thermosetting resins, and so on.

The following examples are given to illustrate the invention and are not intended to limit the scope thereof.

Example 1

The polymerization apparatus consists of a flask provided with stirrer, nitrogen inlet tube and tube for the introduction of the reactants.

Air in the flask is replaced by dry nitrogen and 10 ml. (7.7 g.=113 millimols) of cyclopentene are introduced.

The whole is cooled to $-30°$ C. by keeping the monomer in agitation and 0.082 g. of a 4:3 $AlCl_3/WCl_2$ mixture (obtained as described by Lindner and Kohler, Ber. 55 (1922) 1461) are added, followed by the addition of 0.023 g. of benzoyl peroxide and, finally, of 0.188 millimols of aluminum diethyl monochloride.

The monomer:tungsten dichloride molar ratio is 600:1; the benzoyl peroxide:tungsten dichloride molar ratio is 0.5:1 and the aluminum diethyl monochloride:tungsten dichloride molar ratio is 1:1.

After a very short time, the polymerization starts and a compact block of polymer is formed in the flask. After 1 hour the polymerization is stopped by the addition of 20 cc. of methanol. The polymer is further treated with 100 cc. of methanol containing 5 ml. of 38% hydrochloric acid. It is then dissolved in 50 ml. of benzene containing 50 mg. of phenyl betanaphthylamine. The solution is filtered and poured into 250 ml. of methanol. The coagulated polymer is suspended in methanol and finally dried under reduced pressure at room temperature.

3.5 g. (45% conversion) of a hard, compact, non-tacky whitish polymer having an intrinsic viscosity in toluene at 30° C. of 8 dl./g. are thus obtained.

This polymer is soluble in aromatic hydrocarbons (benzene, toluene) and chlorinated hydrocarbons (carbon tetrachloride, chloro benzene), and in other types of solvents such as carbondisulfide; it is insoluble in ketones and alcohols.

It has the structure of a polypentenamer and has an infrared absorption spectrum in which the following characteristic bands can be observed:

A band at 10.35 microns, which indicates the presence of trans double bonds in the percentage of 85% in respect of the total monomeric units present;

A band at 7.1 microns which indicates the presence of cis double bonds in a proportion of 15%, referred to the total monomeric units present.

Example 2

Cyclopentene is polymerized as and under the conditions described in Example 1, but the metallorganic compound used is aluminum ethylsesquichloride.

The following reactants are used:

10 ml. (7.7 g.=113 millimols) of cyclopentene,
0.082 g. of the 4:3 AlCl$_3$/WCl$_2$ mixture;
0.188 millimol of aluminum ethylsesquichloride [one mole corresponds to ½ Al$_2$(C$_2$H$_5$)$_3$Cl$_3$];
0.094 millimol of benzoyl peroxide.

The monomer:tungsten dichloride molar ratio is 600:1. The aluminum ethylsesquichloride:tungsten dichloride molar ratio is 1:1. The benzoyl peroxide:tungsten dichloride molar ratio is 0.5:1.

The polymerization is carried out for 1 hour at a temperature of −30° C. and is then stopped by the addition of methanol. The polymer is isolated and purified as in Example 1. 1.9 g. (25% yield) of a polymer having properties similar to those of the product described in Example 1 are thus obtained. It has an intrinsic viscosity in toluene at 30° C. of 6.5 dl./g. Examination of its infrared spectrum shows the presence of trans double bonds in a proportion of 80% and of cis double bonds in a proportion of 20%, in respect to the total monomeric units present.

Example 3

The polymerization of cyclopentene is carried out as and under the conditions described in Example 1 by using the following reactants:

10 ml. (7.7 g.=113 millimols) of cyclopentene,
0.0082 g. of the 4:3 AlCl$_3$/WCl$_2$ mixture;
0.188 millimol of aluminum ethyl dichloride;
0.094 millimol of benzoyl peroxide.

The monomer:tungsten dichloride molar ratio is 600:1. The aluminum monoethyl dichloride:tungsten dichloride molar ratio is 1:1. The benzoyl peroxide:tungsten dichloride molar ratio is 0.5:1.

The polymerization, carried out at −20° C., is stopped after 1 hour and the polymer is isolated and purified as in Example 1.

1.1 g. (14% yield) of a compact, non-tacky polymer having an intrinsic viscosity in toluene of 4.3 dl./g. are thus obtained.

By examination of its infrared spectrum it is noted that 27% of the units derived from the monomer have cis double bonds and 73% thereof have trans double bonds.

Example 4

The polymerization of cyclopentene is carried out as and under the conditions described in Example 1, using the following reactants:

10 ml. (7.7 g.=113 millimols) of cyclopentene,
0.082 g. of the 4:3 AlCl$_3$/WCl$_2$ mixture;
0.188 millimol of aluminum diethyl monobromide.

The monomer:tungsten dichloride molar ratio is 600:1. The aluminum diethylmonobromide:tungsten dichloride molar ratio is 1:1. The polymerization is carried out for 1 hour at −20° C. It is then stopped and the polymer is purified and isolated as in Example 1.

1.9 g. (25% yield) of a polymer having properties similar to those of the polymers described in the preceding examples but a rather lower intrinsic viscosity in toluene at 30° C., namely of 3.7 dl./g. are obtained.

This polymer, as determined by examination of the I.R. spectrum, is a polypentenamer in which 80% of the units derived from the monomer have trans double bonds and 20% of said units have cis double bonds.

Example 5

The polymerization of cyclopentene is carried out as and under the conditions described in Example 1, using the following reactants:

10 ml. (7.7 g.=113 millimols) of cyclopentene,
0.082 g. of the 4:3 AlCl$_3$/WCl$_2$ mixture;
0.047 millimol of aluminum diethyl monochloride
0.094 millimol of benzoyl peroxide.

The monomer:tungsten dichloride molar ratio is 600:1. The aluminum diethyl monochloride:tungsten dichloride molar ratio is 0.25:1. The benzoyl peroxide:tungsten dichloride molar ratio is 0.5:1.

The polymerization is carried out for 1 hour at −30° C. It is then stopped and the polymer is isolated and purified as in Example 1.

4.2 g. (55% conversion) of a polymer having an appearance different from that of the polymers described in the preceding examples, namely of a flocky, white polymer are thus obtained.

Examination of the I.R. spectrum established that, in this polymer, the stereospecificity is different in that the major portion of the units derived from the monomer have cis double bonds. Thus, 91% of such units have the cis double bonds and only 9% thereof have trans double bonds.

Example 6

The polymerization of cyclopentene is carried out as and under the conditions of Example 1, by using the following reactants:

10 ml. (7.7 g.=113 millimols) of cyclopentene
0.173 g. of a 5:1 AlCl$_3$/WCl$_2$ mixture
0.188 millimol of aluminum monoethyl dichloride
0.094 millimol of benzoyl peroxide.

The monomer:tungsten dichloride molar ratio is 600:1. The aluminum monoethyl dichloride:tungsten dichloride molar ratio is 1:1. The benzoyl peroxide:tungsten dichloride molar ratio is 0.5:1.

The polymerization is allowed to proceed for 1 hour at −20° C. It is then stopped and the polymer is purified and isolated as in Example 1.

There are thus obtained 3 g. of a polymer (39% conversion) which has properties similar to those of the polymer described in Example 1, and the intrinsic viscosity of which in toluene at 30° C., is 5 dl./g. That 77% of the units derived from the monomer have trans double bonds, and 23% of said units have cis double bonds is shown by examination of the I.R. spectrum for this polymer.

As will be apparent, various changes in details may be made in practicing this invention without departing from the spirit thereof. Therefore, we intend to include in the scope of the appended claims all such modifications and variations as will be obvious to those skilled in the art from the description and illustrative working examples given herein.

What is claimed is:

1. A process for the catalytic polymerization of cyclopentene to a linear, high molecular weight, stereoregular polypentenamer, said process being characterized in that the cyclopentene is polymerized in contact with a catalyst which is the reaction product of an intimate mixture of tungsten dichloride and aluminum chloride with a halogenated organometallic aluminum compound, and in which the molar ratio of the organometallic aluminum compound to tungsten dichloride is from 0.5:1 to 5:1.

2. The process of claim 1, characterized in that the molar ratio of the halogenated organometallic aluminum compound to tungsten dichloride is from 1:1 to 3:1.

3. The process of claim 1, characterized in that the molar ratio of the halogenated organometallic aluminum compound to tungsten dichloride is from 0.5:1 to 0.1:1.

4. The process according to claim 1, characterized in that the molar ratio of aluminum chloride to tungsten dichloride is from 4:3 to 5:1.

5. The process according to claim 1, characterized in that the catalyst also comprises an organic peroxy compound.

6. The process according to claim 5, further characterized in that the organic peroxide is benzoyl peroxide.

7. The process according to claim 1, characterized in that the halogenated organometallic compound used in preparing the catalyst is selected from the group consisting of $Al(C_2H_5)_2Cl$
$Al_2(C_2H_5)_3Cl_3$
$Al(C_2H_5)Cl_2$
$Al(C_2H_5)_2Br$ and $Al(C_2H_5)Br_2$ 8. The process according to claim 1, characterized in that the molar ratio of cyclopentene to tungsten dichloride is from 300:1 to 3,000:1.

9. The process according to claim 1, characterized in that the cyclopentene is polymerized at a temperature of from −50° C. to +70° C.

References Cited

FOREIGN PATENTS 1,425,601  12/1965  France.

JOSEPH L. SCHOFER, Primary Examiner

R. A. GAITHER, Assistant Examiner

UNITED STATES PATENT OFFICE
CERTIFICATE OF CORRECTION

Patent No. USP 3,476,728     Dated November 4, 1969

Inventor(s) Guilio Natta et al

It is certified that error appears in the above-identified patent and that said Letters Patent are hereby corrected as shown below:

Col. 1, line 16 "polypentanamers" should read - - -polypentenamers- - -.

Signed and sealed this 9th day of April 1974.

(SEAL)
Attest:

EDWARD M. FLETCHER, JR.
Attesting Officer

C. MARSHALL DANN
Commissioner of Patents